United States Patent [19]

Roskelley

[11] 4,316,688

[45] Feb. 23, 1982

[54] REINFORCING REMOVABLE POST POCKET TIE-DOWN

[76] Inventor: Milton Roskelley, 229 Juanita Way, San Francisco, Calif. 94127

[21] Appl. No.: 109,048

[22] Filed: Jan. 2, 1980

[51] Int. Cl.³ .......................... B60P 7/06; B60P 7/13; B61D 45/00
[52] U.S. Cl. .................................. 410/102; 410/107; 410/111; 410/116
[58] Field of Search ............... 410/101, 106, 107, 116, 410/46, 102, 111, 112, 113, 114; 296/156

[56] References Cited

U.S. PATENT DOCUMENTS

| | | | |
|---|---|---|---|
| 3,454,253 | 7/1969 | Lippiatt | 296/156 X |
| 3,455,573 | 7/1969 | Magers | 296/156 X |
| 3,595,125 | 7/1971 | Jacobs | 410/106 |
| 3,623,690 | 11/1971 | Bargman, Jr. | 410/116 |
| 3,671,003 | 6/1972 | Henson | 410/81 |
| 3,677,562 | 7/1972 | Bronstein | 410/97 |
| 3,722,910 | 3/1973 | Heckenlaible | 410/107 |
| 4,072,113 | 2/1978 | Thurston | 410/107 |

*Primary Examiner*—Robert R. Song
*Assistant Examiner*—Howard Beltran
*Attorney, Agent, or Firm*—Smyth, Pavitt, Siegemund & Martella

[57] ABSTRACT

A post pocket tie-down for use in pick-up trucks and other vehicles which are equipped with post pockets of the type into which vertical stakes may be inserted includes an elongated stake-like portion that is removably affixed in the post pocket and has an attachment mounting at its top end for removably affixing to the top end alternatively a tie-down anchor, such as an eye, for use in tying down cargo, or an arm inclined downwardly from the top of the stake-like portion and outwardly from the side wall of the truck for use in securing a camper body to the pick-up truck.

12 Claims, 6 Drawing Figures

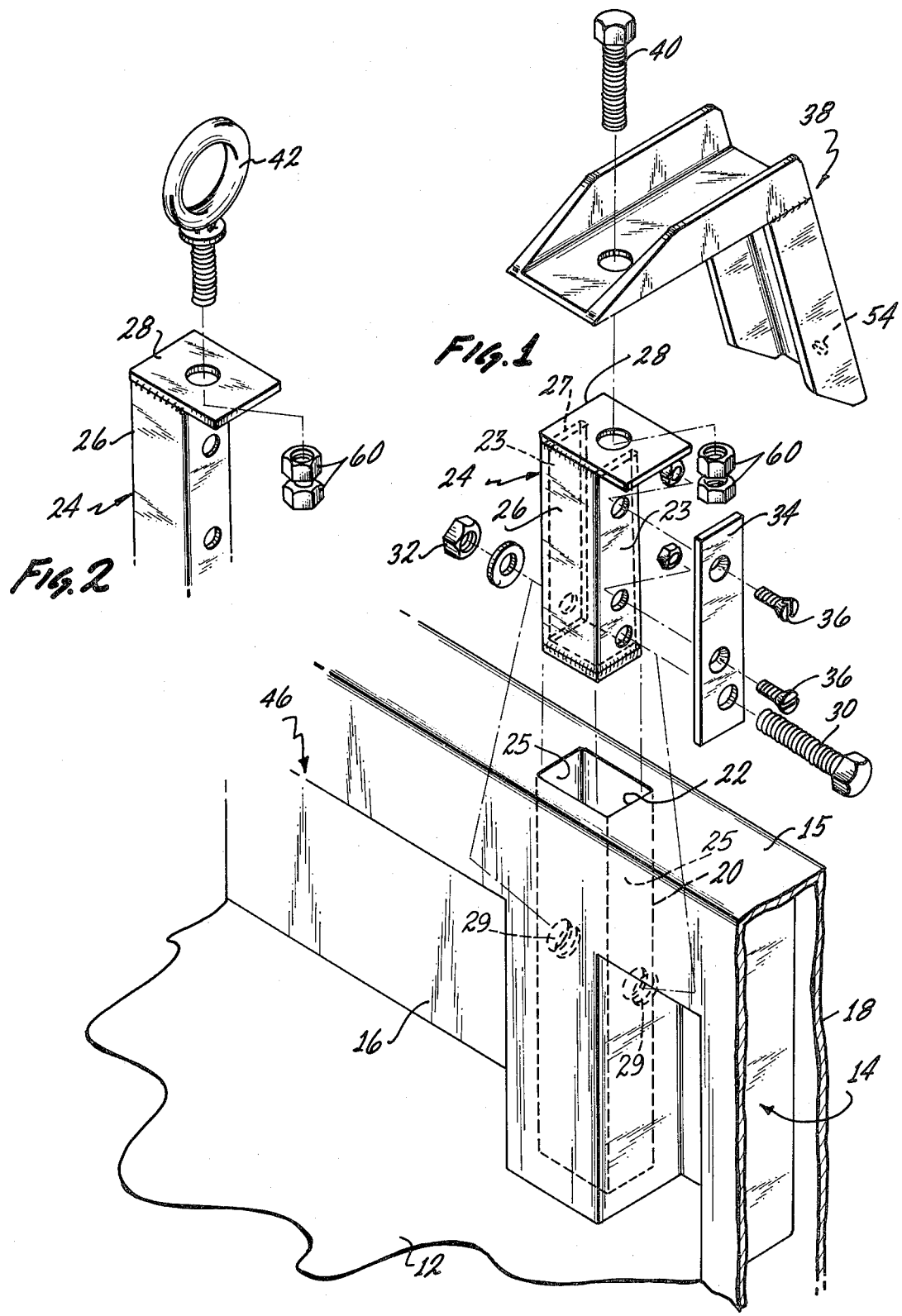

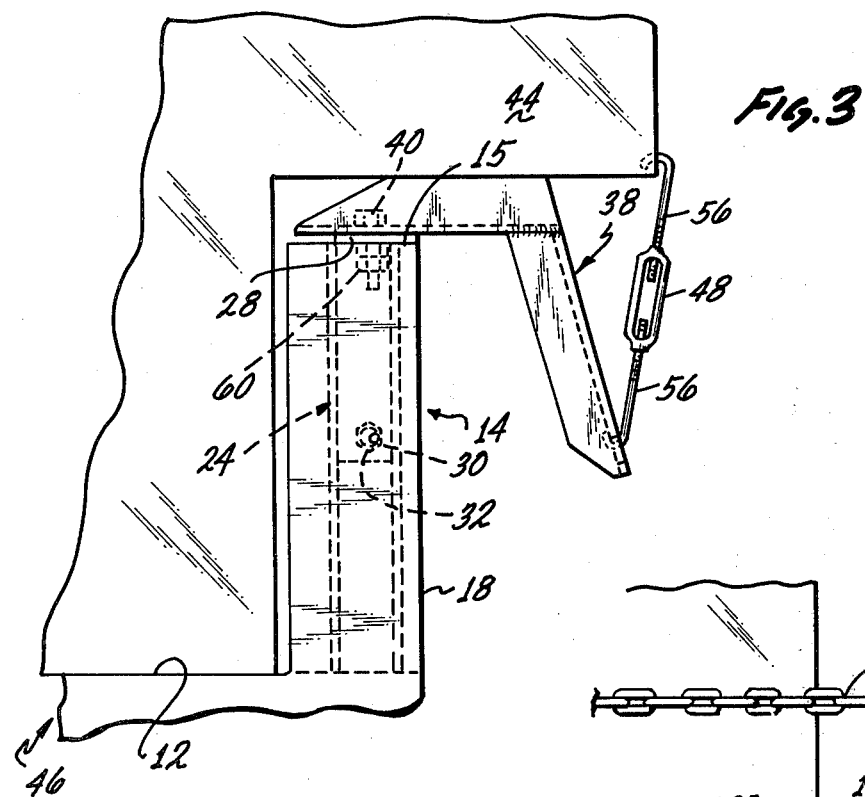
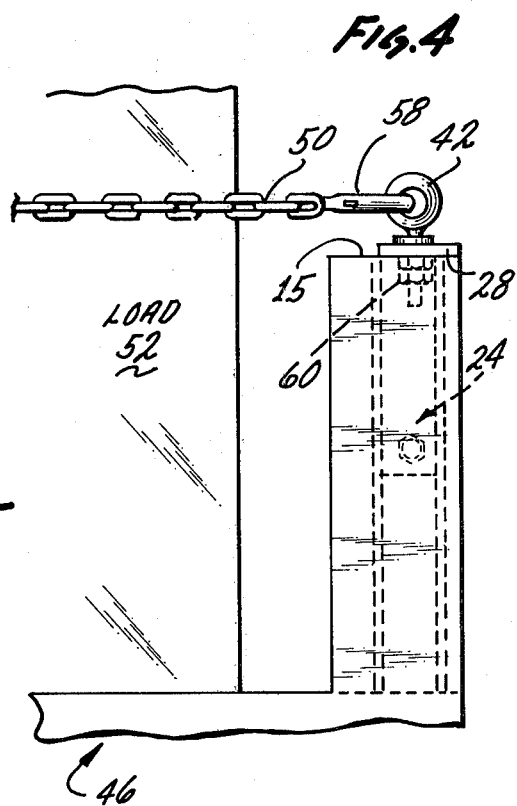
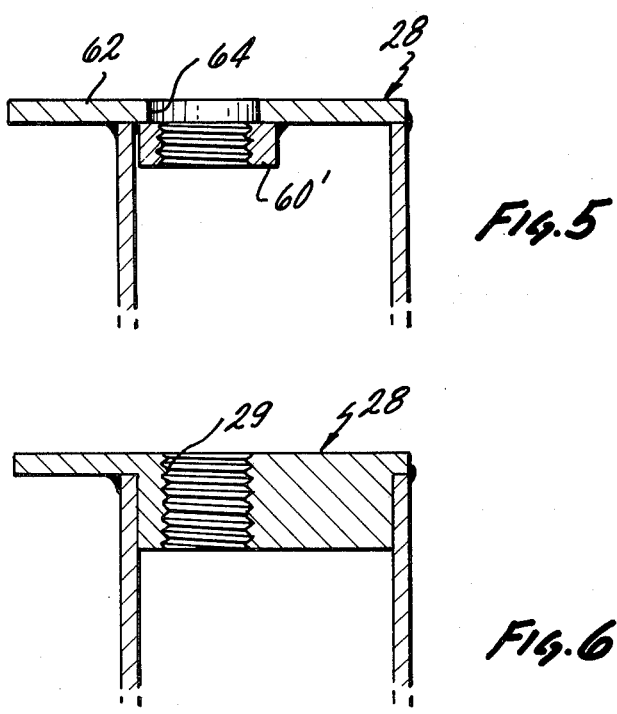

REINFORCING REMOVABLE POST POCKET TIE-DOWN

BACKGROUND OF THE INVENTION

1. Field of the Invention

The present invention is in the field of cargo anchoring devices and is particularly adapted for use in pick-up trucks and other vehicles which are equipped with post pockets of the type into which vertical stakes may be inserted.

2. The Prior Art

Pick-up trucks normally are provided with flat load beds having vertically extending side walls. The side walls are hollow and include a horizontal top surface. On many such trucks, rectangular openings are provided in the horizontal top surface of the hollow side wall to permit stakes to be inserted vertically for various purposes, such as for extending the height of the side walls and for providing a structure to which cargo can be secured. U.S. Pat. No. 3,677,562 issued July 18, 1972, to Brownstein and U.S. Pat. No. 4,072,113 issued Feb. 7, 1978, to Thurston, typify a type of tie-down useful in securing a load.

In recent years it has become common to attach a camper structure to the load bed of a pick-up truck, and campers typically have a lower portion that fits within the bed of the pick-up truck and an upper portion of greater width that extends above the top surface of the hollow walls of the truck. This structure of the camper necessitates a tie-down anchor particularly adapted for such use. Tie-down brackets or anchors of this type are shown in U.S. Pat. No. 3,455,573 issued July 15, 1969, to Nagers and in U.S. Pat. No. 3,454,253 issued July 8, 1969, to Lippiatt.

As shown in U.S. Pat. No. 3,454,253, a hold-down bracket for securing a camper to a pick-up truck may include a vertical post-like member which is inserted into a rectangular hole in the top surface of the wall of the truck, and further includes an arm which extends from the top of the post-like member outwardly from the camper over the top surface of the wall and then extends downwardly to a lower end which includes an aperture or other means to which the camper can be secured, typically by a tensionable member.

A hold-down bracket for securing a camper to a pick-up truck typically includes an outwardly extending arm which is a hazard if left in place after the camper has been removed. One reason for removing the camper is to use the pick-up truck to carry some other load which may need to be secured to the truck. In this case, it is desirable to remove the hold-down brackets used for securing the camper and to replace them with anchors that are less hazardous and that are more appropriate for use in securing cargo.

It is difficult and time consuming to remove the typical camper hold-down bracket and then to install in its place a cargo anchor. This difficulty is caused by the need to undo the fasteners used for securing the post-like portions of the hold-down fittings in the post pockets. Clearly a need exists for a single device that can be used alternatively for holding down a camper or for securing cargo.

SUMMARY OF THE INVENTION

The need for a dual purpose tie-down assembly is filled by the present invention. The present invention can easily be installed in the truck and removed therefrom. The present invention can quickly and easily be adapted for use either in securing cargo or in holding down a camper. In addition, the tie-down assembly of the present invention is both strong and safe in use. The present invention utilizes the post pocket of the hollow side wall of the pick-up truck in such a way as to maximize the strength of the structure by the close fit of a post portion of the present invention into the pocket.

When used to secure a camper to the pick-up truck, the tie-down assembly of the present invention enhances the shear strength of the post pocket wall. This is an important consideration for larger and heavier campers.

When the tie-down assembly of the present invention is used for securing loads, the strength of the structure and its close tolerance become increasingly important for larger loads. The size of the load becomes limited only by the wall strength when the present invention is used.

The novel features which are believed to characterize the invention both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a fractional perspective exploded view showing a preferred embodiment of the present invention and the manner in which it is installed in the post pocket of a pick-up truck;

FIG. 2 gives a fractional perspective exploded view showing a further aspect of the preferred embodiment;

FIG. 3 is a rear elevation view of a pick-up truck showing the use of the present invention to secure a camper to the truck;

FIG. 4 is a rear elevation view of a pick-up truck showing the use of the present invention to secure a load to the truck;

FIG. 5 is a fractional cross sectional elevation view showing an alternative embodiment of the attachment mounting; and, FIG. 6 is a fractional cross sectional elevation view showing another alternative embodiment of the attachment mounting.

DETAILED DESCRIPTION OF THE PREFERRED EMBODIMENT

Turning now to the drawings, there is shown in FIG. 1, a pick-up truck 46 of the type with which the present invention would normally be used. The truck includes a bed 12 on which a load is normally placed and further includes a side wall 14 which extends along the lateral edge of the bed 12.

Typically, the side wall 14 is formed of sheet metal and includes an inner wall 16 which is spaced from an outer wall 18, and further includes a horizontally extending top portion 15. Into the space between the inner wall 16 and the outer wall 18, a sheet metal post pocket 20 extends. The post pocket may be a hollow rectangular box, or may consist in other instances of a more rudimentary structure.

The post pocket 20 has an opening 22 on the top portion 15 of the side wall 14, and as normally used, a stake is inserted downwardly through the opening 22 of the pocket and into the post pocket so that the stake extends above the top portion 15 where it can be used for a variety of purposes well-known in the art.

The post pocket includes a pair of opposing parallel sidewalls 25 in which have been formed a pair of aligned openings 29 as shown in FIG. 1.

In accordance with the present invention, there is provided a post 24 including an elongated portion 26 and an attachment mounting 28. The elongated portion 26 in a preferred embodiment has a size and shape which permits it to be inserted into the opening 22 of the post pocket 20. The elongated portion 26 is sufficiently long that when the elongated portion has been fully inserted into the post pocket, the top-most portion 27 lies at an elevation where it is adjacent to the opening 22 of the post pocket.

The post 24 also includes a pair of opposing side surfaces 23 each of which lies adjacent one of the side walls 25 when the post is inserted into the post pocket.

The post further includes an attachment mounting 28 which is permanently affixed, in a preferred embodiment, to the elongated portion 26. In a preferred embodiment, the attachment mounting 28 is larger than the opening 22 of the post pocket 20 and therefore rests on the top portion 15. In the preferred embodiment, the elongated portion 26 is secured to the post pocket 20 by a bolt 30 and a nut 32 which are put in place after the post has been inserted into the post pocket 20.

In accordance with one aspect of the present invention, an arm 38 is removably affixed by means of the bolt 40 to the post 24 for the purpose of securing a camper 44 to the truck 46 in the manner illustrated in FIG. 3. As seen in FIG. 3, it is common for the camper 44 to extend laterally beyond the side wall 14 of the truck 46. The arm 38 extends downwardly from the top portion 15 of the side wall of the truck and extends laterally outwardly from the side wall 14. The camper 44 is then secured to the arm 38 by means of the eye bolts 56 which are connected by the turnbuckle 48. The turnbuckle 48 permits the eye bolts to be loosened so that the camper can be removed and also permits the camper 44 to be held to the arm 38 under tension when the turnbuckle 48 is tightened. The hole 54 is provided at the distal end of the arm 38 for receiving the eye bolt 56.

In accordance with the preferred embodiment of the present invention, the arm 38 shown in FIGS. 1 and 3, may be removed and replaced by the eye bolt 42 when the pick-up truck is to be used to transport a load 52, as illustrated in FIGS. 2 and 4. Although in FIG. 3 a chain 50 or rope could be attached to the arm 38 if it were permitted to remain in place, in practice it has been found that the projecting arms 38 are hazardous and not well adapted for use with a chain or rope. Thus, in accordance with the present invention, the arm 38 is removed and replaced by the eye bolt 42 which is secured by the nut 60 to the attachment mounting 28. When the eye bolt 42 is used, a chain 50 may readily be attached to the eye bolt by a shackle 58 for securing the load 52 to the truck 46.

In a preferred embodiment, the elongated portion 26 of the post 24 is a U-shaped channel and, therefore, is open along one of its sides. This permits easy placement of a nut 60 on the threaded portion of the bolt 40 or the eye bolt 42 for securing those fasteners to the attachment mounting.

In an alternative embodiment shown in FIG. 5, the attachment mounting 28 is formed by affixing a nut 60 to a plate 62 having a clearance hole 64 in it.

In still another embodiment shown in FIG. 6, the attachment mounting 28 is an unitary machined part including a threaded hole 29.

In a preferred embodiment, all parts of the invention are made of steel. The elongated portion 26 of the post 24 is formed of a section of U-shaped channel. In a preferred embodiment, the arm 38 consists of two U-shaped pieces of flanged channel iron welded together as shown in FIGS. 1 and 3.

In the event the elongated portion 26 of the post 24 as commercially supplied is not sufficiently wide to occupy all of the space in the post pocket 20 of a particular truck, the width of the elongated portion 26 may be augmented by attachment of a shim plate 34 to one side surface 23 as indicated in FIG. 1 so that the augmented elongated portion will fit snugly within the post pocket between the side walls 25. A snug fit is desirable to assure better distribution of the loads from the post to the post pocket to effect mutural reinforcement. The shim plate can be attached to the elongated portion 26 by countersunk screws 36.

In the above specification, a preferred embodiment and several alternative embodiments have been described in detail, and it is clear that still other embodiments would be obvious to those skilled in the art. Those additional embodiments are also considered to be within the scope of the invention which is defined by the appended claims.

What is claimed is:

1. A removable post pocket tie-down, removably insertable into a post pocket of a vehicle for securing loads to the vehicle, said post pocket including a pair of opposing sheet metal sidewalls comprising in combination:

post means including an elongated member of such size and shape as to be removably insertable into a post pocket and to fit snugly when inserted therein, and including a pair of opposing surfaces adjacent said opposing sidewalls;

securing means for retaining said post means within said post pocket; and, means for exerting inward force upon said sheet metal sidewalls to thereby draw said opposing sidewalls against said opposing surfaces of said snugly fitting post means, whereby said sheet metal and said post means are mutually reinforced to strengthen the removable tie-down assembly.

2. The removable post pocket tie-down of claim 1 wherein said means for securing said post comprise a bolt extending through said post means and through both of said opposing sheet metal sidewalls.

3. The removable post pocket tie-down of claim 2 wherein said means for exerting inward force comprise nut means threaded onto said bolt and operative to compress said sheet metal widewalls and said post means.

4. The removable post pocket tie-down of claim 1 further comprising attachment means for removably interchangeably affixing one of a plurality of tie-down fittings to said post means.

5. The removable post pocket tie-down of claim 4 wherein said tie-down fitting further comprises:

arm means securable to said attachment means for use in securing a camper to the vehicle.

6. The removable post pocket tie-down of claim 5 wherein said arm means further include a rigid member that extends downwardly from one portion and outwardly from the vehicle.

7. The removable post pocket tie-down of claim 4 wherein said tie-down fitting further comprises in combination:
anchor means securable to said attachment means for use in securing a load to a vehicle.

8. The removable post pocket tie-down of claim 7 wherein said anchor means further include an eye.

9. The removable post pocket tie-down of claim 7 wherein said anchor means further include a hook.

10. A removable post pocket tie-down, removably insertable into a post pocket of a vehicle for securing loads to the vehicle, said post pocket including a pair of opposing sheet metal sidewalls comprising in combination:

post means including an elongated member of such size and shape as to be removably insertable into a post pocket and to fit snugly when inserted therein and including a pair of opposing surfaces adjacent said opposing side walls;
tie-down means removably affixed to said post means;
securing means for retaining said post means within said post pocket; and,
means for exerting inward force upon said sheet metal sidewalls to thereby draw said opposing sidewalls against said opposing surfaces of said snugly fitting post means, whereby said sheet metal and said post means are mutually reinforced to strengthen the removable tie-down assembly.

11. The removable post pocket tie-down of claim 10 wherein said tie-down means comprise:
arm means for securing a camper to the vehicle.

12. The removable post pocket tie-down of claim 10 wherein said tie-down means comprise:
anchor means for securing a load to a vehicle.

* * * * *